US012069441B2

(12) United States Patent
Mehr

(10) Patent No.: US 12,069,441 B2
(45) Date of Patent: Aug. 20, 2024

(54) HEARING DEVICE EARPIECE AND RECEIVER WITH VENT ASSEMBLY

(71) Applicant: GN Hearing A/S, Ballerup (DK)

(72) Inventor: Ulrik Mehr, Ballerup (DK)

(73) Assignee: GN HEARING A/S, Ballerup (DK)

( * ) Notice: Subject to any disclaimer, the term of this patent is extended or adjusted under 35 U.S.C. 154(b) by 72 days.

(21) Appl. No.: 17/519,203

(22) Filed: Nov. 4, 2021

(65) Prior Publication Data

US 2022/0174435 A1 Jun. 2, 2022

(30) Foreign Application Priority Data

Nov. 30, 2020 (DK) ............................. PA202070806

(51) Int. Cl.
*H04R 25/00* (2006.01)

(52) U.S. Cl.
CPC ......... *H04R 25/603* (2019.05); *H04R 25/554* (2013.01); *H04R 2460/11* (2013.01)

(58) Field of Classification Search
CPC . H04R 25/603; H04R 25/554; H04R 2460/11
USPC .......................................................... 381/322
See application file for complete search history.

(56) References Cited

U.S. PATENT DOCUMENTS

| | | | | |
|---|---|---|---|---|
| 2014/0169603 A1* | 6/2014 | Sacha | H04R 25/652 381/324 |
| 2018/0310085 A1 | 10/2018 | Kang | |
| 2019/0116416 A1 | 4/2019 | Lawland et al. | |
| 2020/0288251 A1 | 9/2020 | Kuipers | |
| 2020/0314532 A1 | 10/2020 | Kuipers | |

FOREIGN PATENT DOCUMENTS

| | | |
|---|---|---|
| CH | 681125 | 1/1993 |
| CN | 207475832 | 6/2018 |
| CN | 207835719 | 9/2018 |
| CN | 211128125 | 7/2020 |
| EP | 3 471 433 A2 | 4/2019 |
| WO | WO 2015/027251 | 3/2015 |

OTHER PUBLICATIONS

Extended European Search Report for EP Patent Appln. No. 21205606.3 dated Apr. 12, 2022.
EP Search report dated Feb. 20, 2019 for EP 3471433.
1st Technical Exam for Danish Patent Application No. PA 2020 70806 dated Sep. 11, 2021.

* cited by examiner

*Primary Examiner* — Phylesha Dabney
(74) *Attorney, Agent, or Firm* — Vista IP Law Group, LLP

(57) ABSTRACT

A vent assembly and a receiver for a hearing device is disclosed, the receiver comprising a receiver housing having a distal end and a proximal end with a first receiver wall extending between the distal end and the proximal end; a receiver membrane; and a vent assembly associated with a vent wall of the receiver housing for venting of a chamber of the receiver housing, the vent assembly comprising a base, the base having one or more vent apertures comprising a first vent aperture, wherein the vent assembly comprises a vent element, the vent element configured to in a first position block the one or more vent apertures in the base and in a second position provide fluid communication through the one or more vent apertures in the base.

22 Claims, 10 Drawing Sheets

HEARING DEVICE EARPIECE AND RECEIVER WITH VENT ASSEMBLY

RELATED APPLICATION DATA

This application claims priority to, and the benefit of, Danish Patent Application No. PA 2020 70806, filed on Nov. 30, 2020. The entire disclosure of the above application is expressly incorporated by reference herein.

FIELD

The present disclosure relates to a hearing device earpiece and a receiver for a hearing device, and in particular earpiece and receiver having a vent assembly.

BACKGROUND

Earpieces are used in a large variety of situations, where an audio signal is presented to the user via the earpiece. Further, earpieces are used in communication systems for presenting to and/or receiving audio signals from the user and/or surroundings.

In two-part hearing devices with an earpiece and a hearing device part, e.g. arranged behind the ear, the earpiece is connected to the hearing device part by a cable comprising one or more wires and/or a sound guiding channel.

Earpieces for hearing devices are typically worn for many hours and therefore wearing comfort is of key importance for a hearing device user. Venting of the ear canal when the earpiece is arranged in the ear canal has proven to be a desired feature e.g. to avoid or reduce occlusion effects. On the other hand, a closed or sealed ear canal may be desired in different user situations.

SUMMARY

Accordingly, there is a need for hearing devices/earpieces and methods with improved fit and sound properties.

Hearing devices, earpieces, receivers, and vent assemblies are disclosed.

A receiver for a hearing device is disclosed, the receiver comprising a receiver housing having a distal end and a proximal end with a first receiver wall extending between the distal end and the proximal end; and a receiver membrane. The receiver optionally comprises a vent assembly associated with a vent wall, such as the first receiver wall, of the receiver housing for venting of a chamber of the receiver housing. The vent assembly comprises a base, the base having one or more vent apertures comprising a first vent aperture, and wherein the vent assembly comprises a vent element. The vent element is optionally configured to in a first position block the one or more vent apertures in the base and/or in a second position provide fluid communication through the one or more vent apertures in the base.

Further, a vent assembly for an earpiece is disclosed, the vent assembly comprising a base, the base having one or more vent apertures comprising a first vent aperture, and wherein the vent assembly comprises a vent element. The vent element is configured to in a first position block the one or more vent apertures in the base and/or in a second position provide fluid communication through the one or more vent apertures in the base.

Also, a hearing device and/or an earpiece of a hearing device, is disclosed, the hearing device and/or the earpiece comprising a receiver as disclosed herein and/or a vent assembly as disclosed herein.

The present disclosure allows for improved control of venting in an earpiece and/or receiver of a hearing device. It is an advantage of the present disclosure that a small and compact vent assembly is provided allowing application in an earpiece of a hearing device.

Further, a low-noise opening and closing of a vent path in an earpiece and/or a power efficient control of a vent path is provided.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
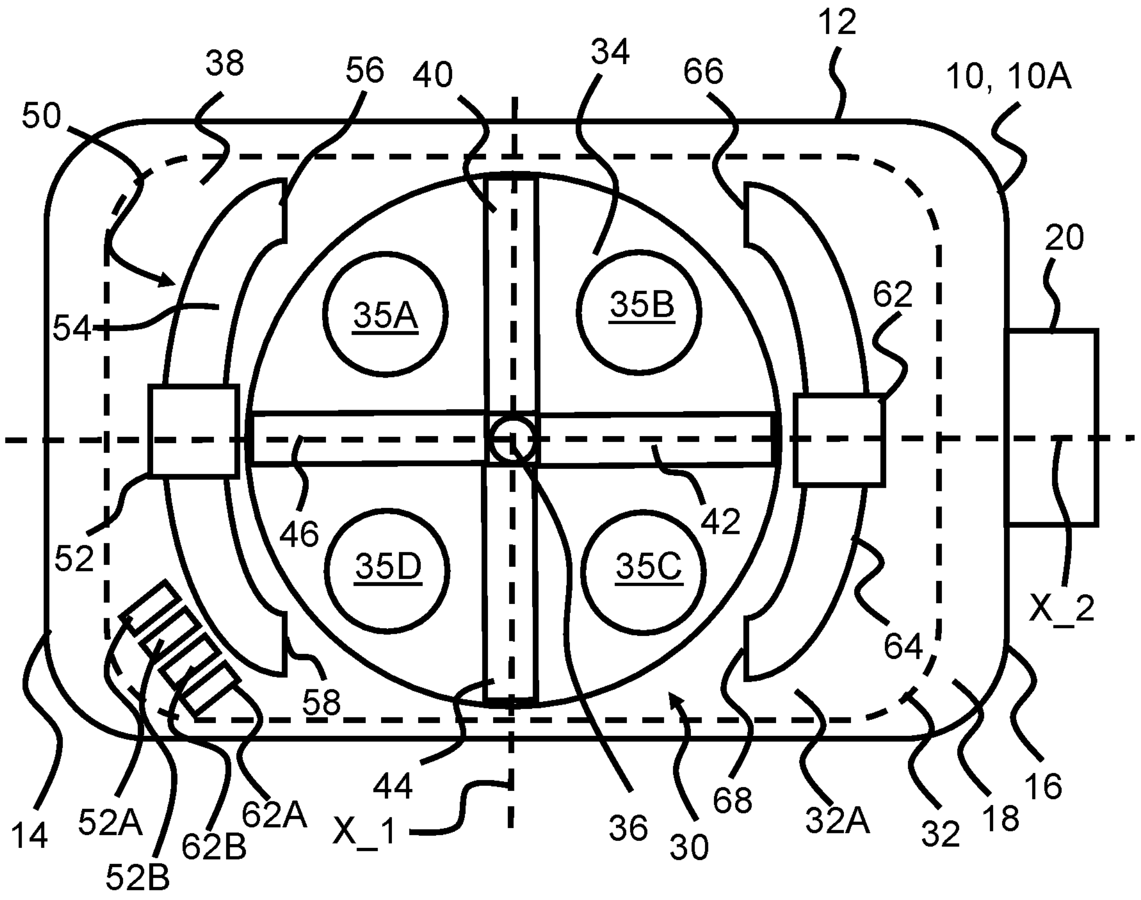
FIG. 1 is a side view of an exemplary receiver with vent element in first position.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

An earpiece comprising a receiver and/or a vent assembly is disclosed. The receiver may be a receiver as disclosed herein and optionally comprises a vent assembly as disclosed herein. In other words, the vent assembly may be integrated in or mounted on the receiver. The vent assembly may be denoted or implement a vent mechanism, such as an active vent mechanism. In other words, the vent assembly may be an active vent assembly.

The earpiece is configured for insertion into an ear canal of a user and has a longitudinal axis. The earpiece comprises an earpiece housing having a distal end, a proximal end, and an outer surface connecting the distal end to the proximal end. The proximal end can herein be seen as the end closest to an ear drum of the user when the earpiece is inserted into the ear of the user. The distal end of the earpiece can herein be seen as the end furthest away from an ear drum of the user when the earpiece is inserted into the ear of the user. The outer surface of the earpiece housing may at least partly define a first volume inside the earpiece housing. The earpiece housing may comprise a first and a second earpiece housing part, such as a distal earpiece housing part and a proximal earpiece housing part. The proximal end of the earpiece housing may have a sound outlet, or an outlet for sound to direct sound to a user's ear drum. The distal earpiece housing part of the earpiece can herein be seen as the part furthest away from an ear drum of the user when the earpiece is inserted into the ear of the user. The proximal earpiece housing part of the earpiece can herein be seen as the part closest to an ear drum of the user when the earpiece is inserted into the ear of the user.

As discussed herein, the terms proximal or proximally can herein be seen as a side, a surface, end, or part closest to an ear drum of the user when the earpiece is inserted into the ear of the user or a side, a surface, end, or part intended to be arranged closest to an ear drum of the user when the earpiece is inserted into the ear of the user. The terms distal or distally can herein be seen as a side, a surface, end, or part furthest away from an ear drum of the user when the earpiece is inserted into the ear of the user or a side, a surface, end, or part intended to be arranged furthest away from an ear drum of the user when the earpiece is inserted into the ear of the user.

The earpiece housing may have tabs and/or extensions and/or cavities and/or receiving surfaces and/or attaching surfaces and/or mating surfaces on an inner surface of the earpiece housing (such as on an inner surface of the proximal end and/or distal end and/or outer surface) for connecting the earpiece housing to further components of the earpiece and/or hearing device, such as one or more of the receiver, a microphone, and a vent assembly as disclosed herein. The earpiece housing may have tabs and/or extensions and/or cavities and/or receiving surfaces and/or attaching surfaces and/or mating surfaces on an outer surface of the earpiece housing (such as on an outer surface of the proximal end and/or distal end and/or outer surface) for connecting the earpiece housing to further components of the earpiece and/or hearing device. For example, the earpiece housing may mate with one or more domes. Further, earpiece housing may include other components, such as a sound tube.

The earpiece housing may have electrical connections on an inner surface of the earpiece housing (such as on an inner surface of the proximal end and/or distal end and/or outer surface) for electrically connecting the earpiece housing to further components of the earpiece and/or hearing device. The earpiece housing may have electrical connections on an outer surface of the earpiece housing (such as on an outer surface of the proximal end and/or distal end and/or outer surface) for electrically connecting the earpiece housing to further components of the earpiece and/or hearing device.

The earpiece housing may contain a processing unit. The processing unit may comprise one or more computer components for operating the earpiece. For example, one or more power storage components and/or one or more processors and/or one or more microchips and/or one or more digital signal processors and/or one or more circuit boards and/or wiring may be partially or fully contained within the earpiece housing.

The receiver and/or receiver housing may include a spout extending from the receiver housing, e.g. from the proximal end or the outer surface (first receiver wall) of the receiver housing. The spout may provide fluid communication between the receiver housing, such as the front chamber, and outside of the earpiece housing. The spout may extend proximally or at least partly proximally from the receiver and/or receiver housing. The spout may remain within the earpiece housing. The spout may extend proximally beyond the earpiece housing. The spout may have a circular or ovaloid cross section, though the particular shape of the spout is not limiting.

A hearing device is disclosed. The hearing device comprises an earpiece, e.g. as disclosed herein, and may be configured to be worn at an ear of a user and may be a hearable or a hearing aid, wherein the processing unit is configured to compensate for a hearing loss of a user. The hearing device may be of the behind-the-ear (BTE) type, in-the-ear (ITE) type, in-the-canal (ITC) type, receiver-in-canal (RIC) type, receiver-in-the-ear (RITE) type, and/or microphone-and-receiver-in-ear (MaRie) type.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

A receiver for a hearing device is disclosed, the receiver comprising a receiver housing having a distal end and a proximal end with a first receiver wall extending between the distal end and the proximal end; and a receiver membrane.

The receiver may comprise a vent assembly associated with a vent wall, such as the first receiver wall or a distal end wall, of the receiver housing for venting of a chamber, such as a front chamber or a back chamber, of the receiver housing.

The vent assembly comprises a base, the base having one or more vent apertures comprising a first vent aperture. The base of the vent assembly may be attached to, integrated in, or form the vent wall. The base may be a printed circuit board. The base may have a thickness in the range from 0.05 mm to 2.0 mm, such as in the range from 0.1 mm to 1.0 mm, e.g. 0.3 mm, 0.4 mm or 0.5 mm. The base may be made of or coated with Teflon. The base may be made of or comprise a ceramic material.

The one or more vent apertures of the base may comprise a second vent aperture and/or a third vent aperture. The one or more vent apertures of the base may comprise a fourth vent aperture and/or a fifth vent aperture. In other words, the base may comprise two, three, four, five, or more vent apertures.

A vent aperture of the base, such as the first vent aperture and/or a second vent aperture of the one or more vent apertures of the base, may be circular, oval, arch-shaped, or polygonal, such as triangular, rectangular, or squared, optionally with one or more rounded corners.

A vent aperture of the base, such as the first vent aperture and/or a second vent aperture of the one or more vent apertures of the base, may have an area in the range from 0.5 $mm^2$ to 10 $mm^2$. In one or more exemplary vent assemblies, one or more vent apertures of the base, such as the first vent aperture and/or a second vent aperture of the base, are circular and optionally has a diameter in the range from 0.5 mm to 4 mm, such as in the range from 0.8 mm to 2.5 mm, e.g. in the range from 1.0 mm to 2.0 mm.

The vent assembly comprises a vent element. The vent element may be configured to in a first position block or at least partly block the one or more vent apertures in the base. In other words, the vent element may in the first position be configured to reduce, limit or prevent fluid communication through the one or more vent apertures in the base. The first position may be denoted a closed position. The first position of the vent element may allow fluid communication to a first degree, e.g. by provision of a vent path having a first vent capacity. A vent capacity may be characterized by an available cross-sectional flow area through the vent assembly. In other words, the first position of the vent element may provide a first cross-sectional flow area, also denoted FA_1, through the vent assembly. FA_1 may be zero.

The vent element may be configured to in a second position provide fluid communication through the one or more vent apertures in the base. In other words, the vent element may in the second position be configured to allow fluid communication through the one or more vent apertures in the base. The second position may be denoted an open position. The second position of the vent element may allow fluid communication to a second degree, e.g. by provision of a vent path having a second vent capacity. The second vent capacity may be larger than the first vent capacity. The second position of the vent element may provide a second cross-sectional flow area, also denoted FA_2, through the vent assembly.

The vent element may be configured to in a third position provide fluid communication through the one or more vent apertures in the base. In other words, the vent element may in the third position be configured to allow fluid communication through the one or more vent apertures in the base. The third position may be denoted an open position. The third position of the vent element may allow fluid communication to a third degree, e.g. by provision of a vent path having a third vent capacity. The third vent capacity may be larger than the first vent capacity and/or the second vent capacity. The third vent capacity may be an intermediate vent capacity, e.g. the third vent capacity may between the first vent capacity and the second vent capacity. The third position of the vent element may provide a third cross-sectional flow area, also denoted FA_3, through the vent assembly. In one or more exemplary vent assemblies, FA_1<FA_3<FA_2.

The vent element may be configured to in a fourth position provide fluid communication through the one or more vent apertures in the base. In other words, the vent element may in the fourth position be configured to allow fluid communication through the one or more vent apertures in the base. The fourth position may be denoted an open position. The fourth position of the vent element may allow fluid communication to a fourth degree, e.g. by provision of a vent path having a fourth vent capacity. The fourth vent capacity may be larger than the second vent capacity. The fourth vent capacity may be an intermediate vent capacity, e.g. the fourth vent capacity between the first vent capacity and the second vent capacity. The fourth vent capacity may be larger than the third vent capacity. The fourth position of the vent element may provide a fourth cross-sectional flow area, also denoted FA_4, through the vent assembly.

The vent element may be a circular disc or plate. The vent element may have a thickness in the range from 0.05 mm to 2.0 mm, such as in the range from 0.1 mm to 1.0 mm, e.g. 0.3 mm, 0.4 mm or 0.5 mm. The vent element may be made of or coated with Teflon. The vent element may be made of or comprise a ceramic material. The circular disc may have a diameter in the range from 2 mm to 10 mm, such as in the range from 4 mm to 8 mm, e.g. about 5 mm, 6 mm, or 7 mm. A circular disc may be preferred for forming a symmetric and balanced vent element.

The vent element may be configured to move along a surface of the base, such as along a surface of the vent wall. In other words, to move the vent element from one position to another, such as from the first position to the second position, may comprise to move the vent element along a surface of the base.

In one or more exemplary receivers/vent assemblies, the vent element is configured to move along a surface of the vent wall, from the first position to the second position. It is to be understood, that to move the vent element along a surface of the base comprises to rotate the vent element about an axis perpendicular to the surface and/or shifting the vent element parallel to the surface.

In one or more exemplary receivers/vent assemblies, the vent assembly comprises an axle member attached to the base. The vent may be configured to rotate about a rotation axis of the axle member, e.g. from the first position to the second position and/or from the second position to the first position. To rotate the vent element from the first position to the second position may comprise rotating the vent element at least 15 degrees, such as in the range from 30 degrees to 180 degrees, e.g. 45 degrees, 60 degrees, or 90 degrees, about the rotation axis in relation to the base.

In one or more exemplary receivers/vent assemblies, the vent element comprises one or more vent apertures including a first vent aperture and/or a second vent aperture. In the second position of the vent element, the vent element optionally provides fluid communication through the one or more vent apertures in the vent element, such as through the first vent aperture and/or the second vent aperture of the vent element. In one or more exemplary receivers/vent assemblies, the area of the vent apertures of the vent element is in the range from 0.2 to 0.5 of the area of the vent element (as defined by outer circumference or diameter of vent element).

The one or more vent apertures of the vent element may comprise a third vent aperture and/or a fourth vent aperture. The one or more vent apertures of the vent element may comprise a fifth vent aperture. In other words, the vent element may comprise two, three, four, five, or more vent apertures. A vent element comprising four vent apertures or more may be preferred, e.g. for forming a balanced vent element.

A vent aperture of the vent element, such as the first vent aperture and/or a second vent aperture of the one or more vent apertures of the vent element, may be circular, oval, arch-shaped, or polygonal, such as triangular, rectangular, or squared, optionally with one or more rounded corners.

A vent aperture of the vent element, such as the first vent aperture and/or a second vent aperture of the one or more vent apertures of the vent element, may have an area in the range from 0.5 $mm^2$ to 10 $mm^2$. In one or more exemplary vent assemblies, one or more vent apertures of the vent element, such as the first vent aperture and/or a second vent aperture of the vent element, are circular and/or optionally has a diameter or largest extension in the range from 0.5 mm to 4 mm, such as in the range 0.8 mm to 2.0 mm.

In one or more exemplary receivers/vent assemblies, the one or more vent apertures of the base are, in the first position of the vent element, misaligned or non-overlapping with the one or more vent apertures of the vent element.

In one or more exemplary receivers/vent assemblies, the one or more vent apertures of the base are, in the second position of the vent element, aligned with or overlapping the one or more vent apertures of the vent element.

In one or more exemplary receivers/vent assemblies, the first vent aperture of the vent element, in the second position of the vent element, is configured to be aligned with the first vent aperture in the base.

In one or more exemplary receivers/vent assemblies, the one or more vent apertures of the base are, in the third position of the vent element, partly aligned with or partly overlapping the one or more vent apertures of the vent element.

In one or more exemplary receivers/vent assemblies, the first vent aperture of the vent element, in the third position of the vent element, is configured to be partly aligned with the first vent aperture in the base or configured to be aligned or partly aligned with a second vent aperture in the base.

In one or more exemplary receivers/vent assemblies, the vent assembly comprises an actuator assembly for moving the vent element, e.g. in relation to the base, such as from the first position to the second position and/or from the second position to the first position. The vent assembly may be operated electronically and/or automatically and/or manually and/or mechanically. The opening and closing of the vent mechanism may not be audible to the user.

In one or more exemplary receivers/vent assemblies, the actuator assembly comprises one or more magnets including a first magnet, e.g. arranged on, such as glued to, a distal surface of the vent element or arranged on the base. Magnet (s), such as the first magnet, of the actuator assembly may be a bar magnet having a length in the range from 2 mm to 6 mm and a width in the range from 3 mm to 4 mm. Magnet(s), such as the first magnet, of the actuator assembly may be a bar magnet having a height in the range from 0.5 mm to 2 mm. The magnets of the actuator assembly may be recessed in the distal surface of the vent element, e.g. to reduce the height and thereby the size of the vent assembly and/or provide accurate positioning of the magnets. Thus, the vent element may comprise one or more recesses in the distal surface corresponding to the magnets of the actuator assembly. The magnets may be arranged radially from the axle member, i.e. with their longitudinal axes crossing the axle member.

The actuator assembly may comprise one or more magnetic actuators including a first magnetic actuator and/or a second magnetic actuator. The first magnetic actuator is configured to apply a magnetic flux to one or more magnets of the vent assembly and may be arranged on the base or arranged on a distal surface of the vent element. The first magnetic actuator optionally comprises a first coil and optionally a first flux aligner. The first magnetic actuator may be configured to apply a magnetic flux to the first magnet, e.g. when current is applied to the first coil.

The vent assembly may comprise a first primary terminal and a first secondary terminal, respectively connected to an end of the first coil. The first primary terminal and the first secondary terminals may be formed as solder pads and optionally arranged on the base.

The second magnetic actuator is configured to apply a magnetic flux to one or more magnets of the vent assembly and may be arranged on the base or arranged on a distal surface of the vent element. The second magnetic actuator optionally comprises a second coil and optionally a second flux aligner. The second magnetic actuator may be configured to apply a magnetic flux to one or more magnets of the actuator assembly, such as to the second magnet, e.g. when current is applied to the second coil. A plurality of magnetic actuators may provide a more accurate control of and/or increase the number of available positions of the vent element.

The vent assembly may comprise a second primary terminal and a second secondary terminal, respectively connected to an end of the second coil. The second primary terminal and the second secondary terminals may be formed as solder pads and optionally arranged on the base. The first secondary terminal and the second secondary terminal may be integrated in a common secondary terminal, e.g. forming a ground for the first coil and the second coil.

In one or more exemplary receivers/vent assemblies, the one or more magnets comprises a second magnet, optionally a third magnet, and optionally a fourth magnet arranged on the distal surface of the vent element or on the base.

The first magnet and/or the third magnet may be arranged along a primary axis, e.g. with a first end (first pole e.g. negative pole or south pole) of the first magnet and a second end (second pole e.g. positive pole or north pole) of the third magnet pointing in opposite directions. The primary axis may be perpendicular to the rotation axis. The primary axis may cross the rotation axis.

The second magnet and/or the fourth magnet may be arranged along a secondary axis, e.g. with a first end (first pole) of the second magnet and a second end (second pole) of the fourth magnet pointing in opposite directions. The primary axis may form an angle with the secondary axis, e.g. larger than 45 degrees, such as about 60 degrees or about 90 degrees. The secondary axis may be perpendicular to the rotation axis. The secondary axis may cross the rotation axis.

In one or more exemplary receivers/vent assemblies, the first magnet and the third magnet are arranged on each side of the rotation axis and/or the second magnet and the fourth magnet are arranged on each side of the rotation axis.

In one or more exemplary receivers, the vent assembly is arranged inside the receiver housing.

In one or more exemplary receivers/vent assemblies, the vent assembly comprises a spring configured to apply a force, e.g. along the rotation axis, to the vent element for ensuring a tight fit between the base and the vent element. In other words, the spring may be configured to keep the vent element in a position by providing a friction between the surface of the base and the vent element. In one or more exemplary receivers/vent assemblies, the magnets are configured to apply a force, e.g. along the rotation axis, to the base or the first receiver wall for ensuring a tight fit between the base and the vent element. In other words, the magnet(s) may be configured to keep the vent element in a position by providing a friction between the surface of the base and the vent element.

In one or more exemplary earpieces, the inner surface of the earpiece housing comprises a circumferential rim extending around an inner surface of the earpiece housing and optionally mating and/or forming a seal with the base of the vent assembly. In other words, the base may be configured for mating with a circumferential rim on the inner surface of the earpiece housing. The circumferential rim may form an opening that is covered by the base of the vent assembly (e.g., hole, empty space, opening, gap) within the earpiece housing. The circumferential rim can include mating features.

In one or more exemplary earpieces, the vent assembly is arranged distal to the receiver in the earpiece housing, e.g. with the edge of the base corresponding to and sealing with the inner surface of the earpiece housing. Thus, the vent assembly may extend a cross-section of the earpiece housing e.g. perpendicular to the longitudinal axis of the earpiece.

In one or more exemplary receivers/vent assemblies, the vent assembly comprises one or more side walls including a first side wall and/or a second side wall, extending from the base. The one or more side walls and the base may, optionally together with one or more magnetic actuators, such as the first magnetic actuator and/or the second magnetic actuator, form a cavity accommodating the vent element, magnets and axle member. The first side wall and/or the second side wall may have a height less than 10 mm, such as less than 5 mm.

The side wall(s) and optionally the one or more magnetic actuators may be glued and sealed to the outer surface of the receiver, such as to the outer surface of the first receiver wall. In other words, the side wall(s) and optionally the one or more magnetic actuators may be configured for attachment, such as sealed attachment to a vent wall of the receiver or an inner surface of the earpiece. One or more vent apertures in the first receiver wall, a distal end of the receiver, or a second receiver wall may form fluid communication between a chamber of the receiver and the cavity. The vent assembly in its open positions may form fluid communication between the cavity and the outside of the receiver/earpiece.

FIG. 1 shows a view of an exemplary receiver for a hearing device. The receiver 10, 10A comprises a receiver housing 12 having a distal end 14 and a proximal end 16 with a first receiver wall 18 extending between the distal end 14 and the proximal end 16. The receiver 10 comprises a spout 20 optionally arranged at the proximal end 16 of receiver housing 12 and configured for guiding audio generated by a receiver membrane (not shown) out of the receiver housing.

Figure 2:
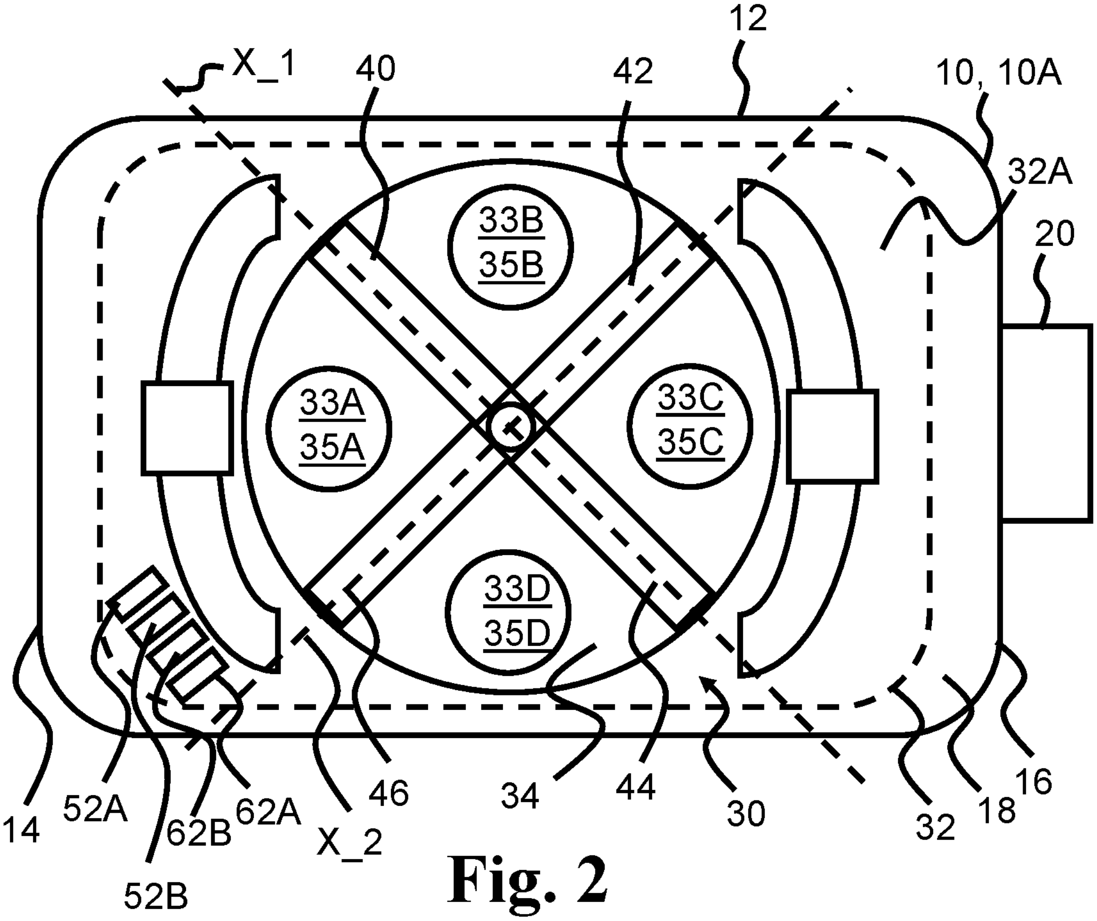
FIG. 2 is a side view of an exemplary receiver with vent element in second position.

The receiver 10, 10A comprises a vent assembly 30 associated with a vent wall of the receiver housing 12. In the receiver 10, the first receiver wall 18 forms the vent wall for venting of a chamber of the receiver housing 12. The vent assembly 30 comprises a base 32, the base 32 having a first surface 32A and one or more vent apertures not shown in FIG. 1 but later referred to by 33A, 33B, 33C, 33D e.g. in FIG. 2. The base 32 may be a separate base as illustrated by the dotted line in FIG. 1 for receiver 10 or integrated in or constituted by the vent wall (first receiver wall 18) for receiver 10A. The vent assembly 30 comprises a vent element 34, the vent element configured to in a first position as shown in FIG. 1 block the one or more vent apertures in the base 32, and in a second position, see FIG. 2, provide fluid communication through the one or more vent apertures in the base 32.

The vent element 34 is arranged on and configured to move along the first surface 32A of the base 6 or along the outer surface of the first receiver wall 18.

The vent element 34 comprises one or more of vent apertures including a first vent aperture 35A, a second vent aperture 35B, a third vent aperture 35C, and a fourth vent aperture 35D, each vent aperture 35A, 35B, 35C, 35D being circular with a diameter of 1.5 mm.

The vent assembly 30 comprises an axle member 36 attached to the base 32, and the vent element 34 is configured to rotate about a rotation axis of the axle member 36 between different positions including from the first position to the second position and from the second position to the first position. In other words, the vent element 34 is configured to move along a surface 38 of the base from the first position to the second position.

The vent assembly 30 comprises an actuator assembly configured for moving the vent element 34 e.g. from the first position to the second position and/or from the second position to the first position along the first surface 32A or surface 38 of the base 32. The actuator assembly comprises one or more magnets optionally arranged on, e.g. glued or molded to or embedded in, a distal surface 40 of the vent element 34. The one or more magnets of the actuator assembly comprises a first magnet 40, a second magnet 42, a third magnet 44, and a fourth magnet 46 being bar magnets extending radially from the axle member 36.

The first magnet 40 and the third 44 magnet are permanent bar magnets and arranged along a primary axis X_1 on each side of the rotation axis/axle member 36, and the second magnet 42 and the fourth magnet 46 are permanent bar magnets and arranged along a secondary axis X_2 on each side of the rotation axis/axle member 36. The primary axis X_1 and the secondary axis X_2 are perpendicular, however other angles larger than 45 degrees, such as larger than 75 degrees may be employed. The first poles of the first magnet 40 and the second magnet 42 point away from the axle member 36 and opposite second poles of the first magnet 40 and the second magnet 42 point towards the axle member 36. The first poles of the third magnet 44 and the fourth magnet 46 point towards the axle member 36 and opposite second poles of the third magnet 44 and the fourth magnet 46 point away from the axle member 36.

The actuator assembly of the vent assembly 30 comprises a first magnetic actuator 50 arranged on the base 32 and including a first coil 52 and a first flux aligner 54. The first flux aligner 54 has a first end 56 and a second end 58 arranged to focus magnetic flux to magnets 40, 42, 44, 46 and thereby control the position of the vent element 34 by controlling the current through the first coil 52. The vent assembly 30 comprises a first primary terminal 52A and a first secondary terminal 52B arranged on the first surface 32A of the base 32 and respectively connected to an end of the first coil 52 for feeding current to the first coil 52. The first primary terminal 52A and the first secondary terminal 52B may be formed as solder pads.

Further, the actuator assembly of the vent assembly 30 optionally comprises a second magnetic actuator 60 arranged on the base 32 and including a second coil 62 and a second flux aligner 64. The second flux aligner 64 has a first end 66 and a second end 68 arranged to focus magnetic flux to magnets 40, 42, 44, 46 and thereby control the position of the vent element 34 by controlling the current through the second coil 62. The vent assembly 30 comprises a second primary terminal 62A and a second secondary terminal 62B arranged on the first surface 32A of the base 32 and respectively connected to an end of the second coil 62 for feeding current to the second coil 62. The second primary terminal 62A and the second secondary terminal 62B may be formed as solder pads.

The ends 56, 58, 66, 68 of the flux aligners 54, 64 are evenly distributed circumferentially around the vent element 34.

FIG. 2 shows the same view as in FIG. 1 but with the vent element 34 in a second position. The vent element 34 has been rotated 45 degrees about the rotation axis of the axle member 36 by controlling a first current in the first coil 52 and/or a second current in the second coil 62. In the second position, the vent assembly 30 provide fluid communication through the one or more vent apertures in the base by aligning the vent apertures 35A, 35B, 35C, 35D of the vent element 34 with corresponding vent apertures of the base 32.

Figure 3:
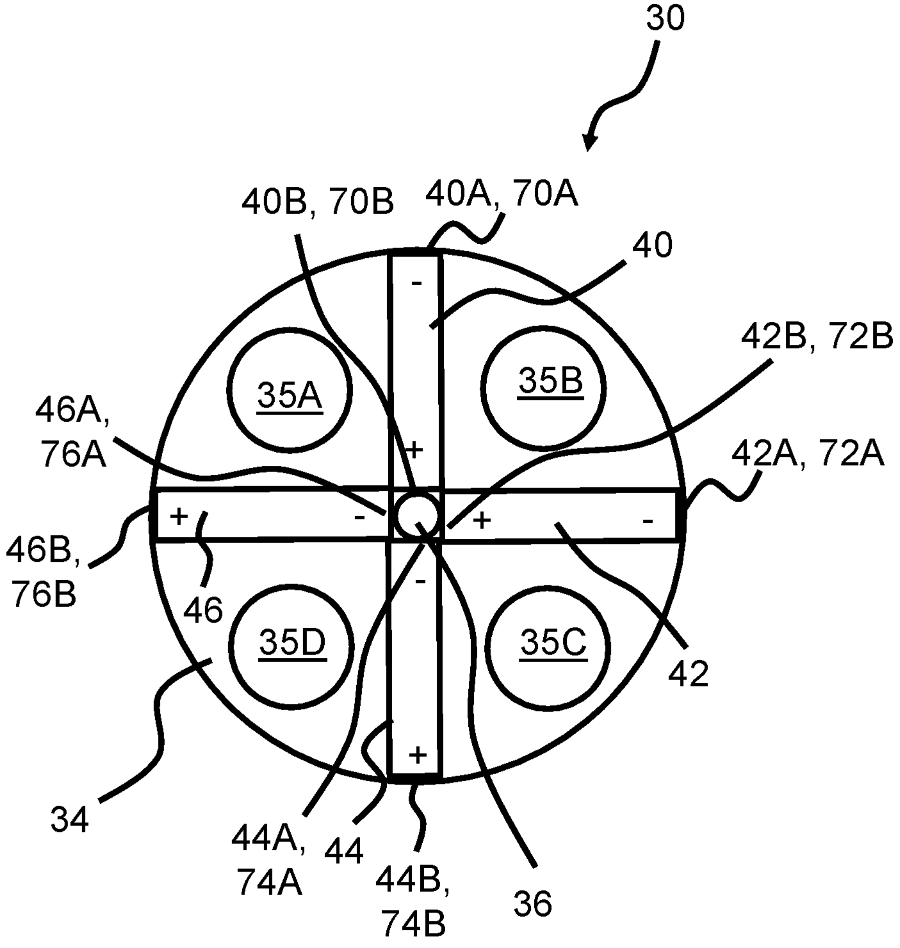
FIG. 3 shows parts of a vent assembly.

FIG. 3 shows parts of the vent assembly 30 of FIG. 1. The first magnet 40 is a bar magnet having a first pole 40A at first end 70A of the first magnet 40 and a opposite second pole 40B at second end 70B of the first magnet opposite the first pole 40A. The first pole 40A of the first magnet 40 points away from the axle member 36. The second magnet 42 is a bar magnet having a first pole 42A at first end 72A of the second magnet 42 and a opposite second pole 42B at second end 72B of the second magnet opposite the first pole 42A. The first pole 42A of the second magnet 42 points away from the axle member 36. The third magnet 44 is a bar magnet having a first pole 44A at first end 74A of the third magnet 44 and an opposite second pole 44B at second end 74B of the third magnet opposite the first pole 44A. The second pole 44B of the third magnet 44 points away from the axle member 36. The fourth magnet 46 is a bar magnet having a first pole 46A at first end 76A of the fourth magnet 46 and an opposite second pole 46B at second end 76B of the fourth magnet opposite the first pole 46A. The second pole 46B of the fourth magnet 46 points away from the axle member 36. The first magnet 40 and the third magnet 44 may be embodied as a single magnet. The second magnet 42 and the fourth magnet 46 may be embodied as a single magnet.

The first poles 40A, 42A, 44A, 46A may be negative poles, i.e. south seeking poles of magnets 40, 42, 44, 46, with the second poles 40B, 42B, 44B, 46B being positive poles i.e. north seeking poles of magnets 40, 42, 44, 46, or vice versa.

Figure 4:
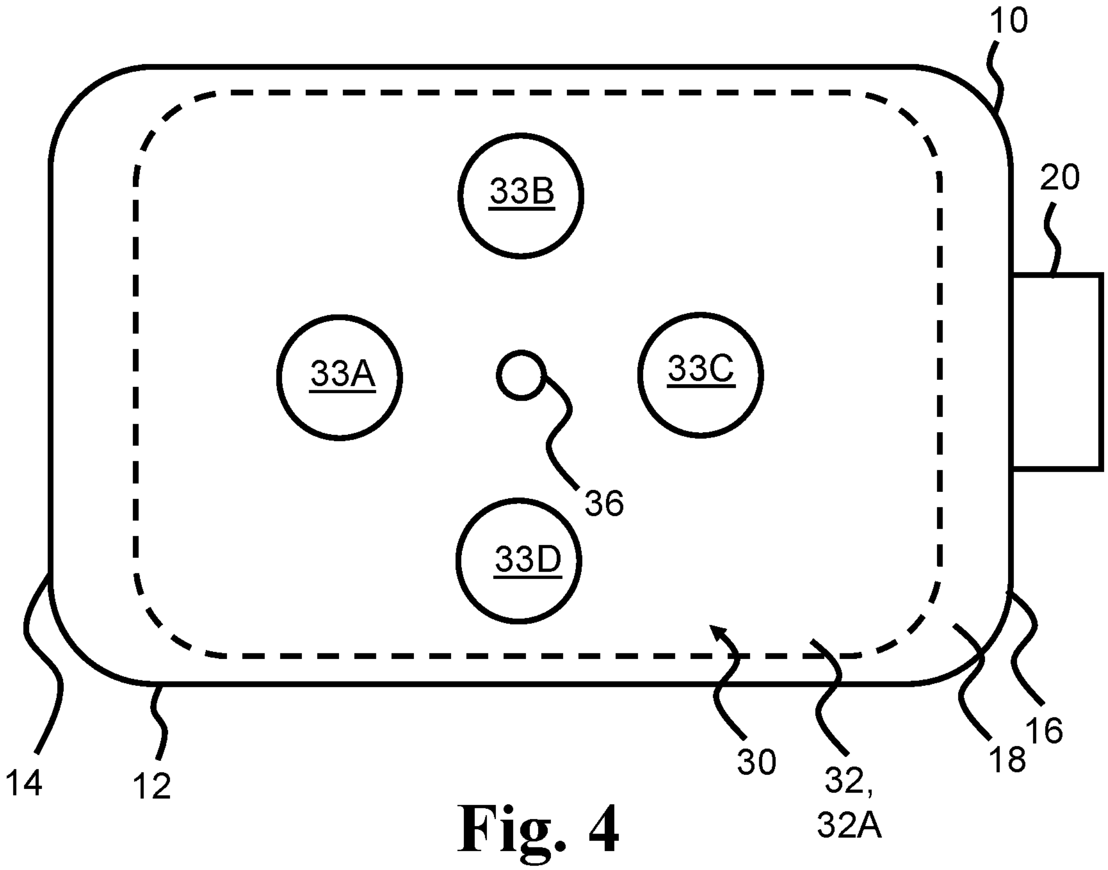
FIG. 4 shows a receiver without parts of the vent assembly.

FIG. 4 shows the receiver 10 of FIG. 1 with only parts of the vent assembly 30. The base 32 has one or more vent apertures including a first vent aperture 33A, a second vent aperture 33B, a third vent aperture 33D, and a fourth vent aperture 33D. The four vent apertures 33A, 33B, 33C, 33D are evenly distributed circumferentially around the axle member 36. In the second position of the vent element as illustrated in FIG. 2, the first vent aperture 33A is aligned with the first vent aperture 35A, the second vent aperture 33B is aligned with the second vent aperture 35B, the third vent aperture 33C is aligned with the third vent aperture 35C, and the fourth vent aperture 33D is aligned with the fourth vent aperture 35D to form fluid communication through the aligned vent apertures of the base 32 and the vent element 34.

Figure 5:
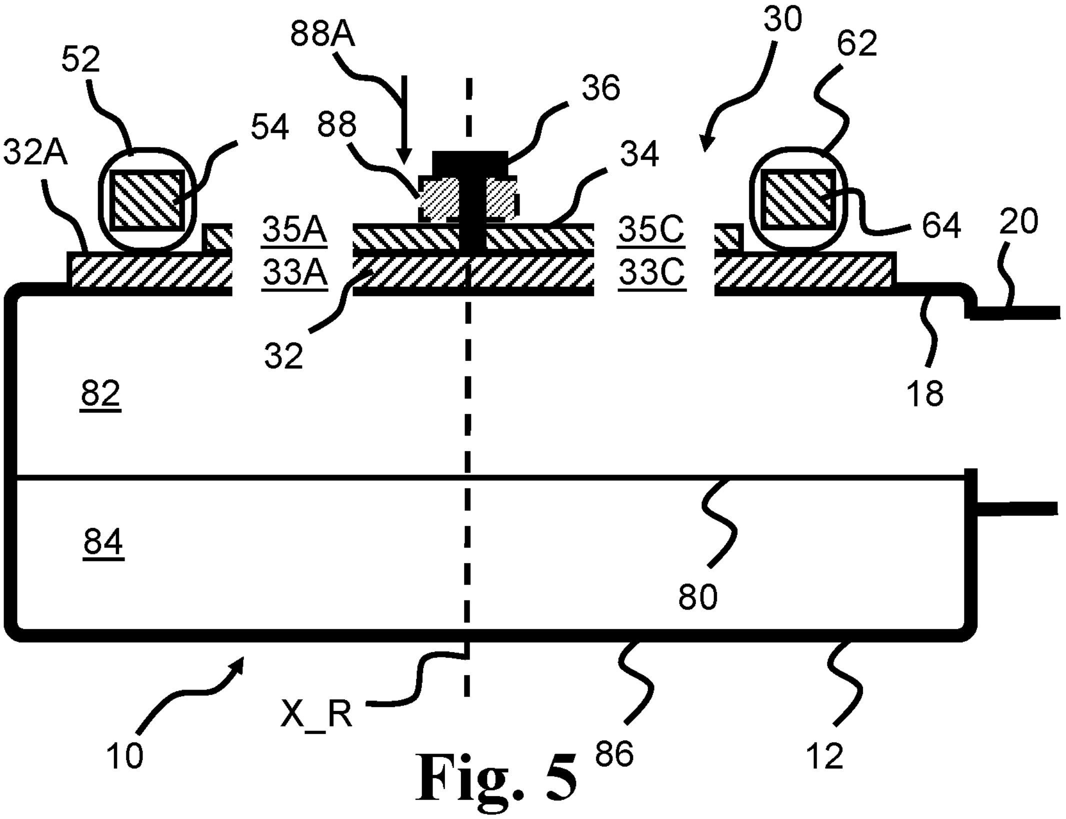
FIG. 5 shows a cross-section of a receiver.

FIG. 5 shows a cross-section of the receiver 10 in FIG. 2 with the vent element 34 in the second position. The vent element 34 is rotatably arranged about rotation axis X_R through axle member 36. The receiver 10 comprises a receiver membrane 80 forming a front chamber 82 and a back chamber 84 in the receiver housing 12 on each side of the receiver membrane 80. In the second position, the vent assembly 30 provides fluid communication through the aligned vent apertures 33A, 33B, 33C, 33D, 35A, 35B, 35C, 35D in the base 32 and in the vent element 34 from the front chamber 82 to an outside of the receiver housing 12. The vent assembly 30 comprises a spring 88 configured to apply a force (illustrated with arrow 88A) to the vent element 34 for ensuring a tight fit between the (first surface 32A of the) base 32 and the vent element 34. The vent assembly 30 is mounted on the receiver by gluing second surface 32B (opposite first surface 32A) of the base 32 to the outer surface of the first receiver wall 18.

It is to be noted that the vent assembly may be arranged on a second receiver wall between the distal end and the proximal end of the receiver housing, e.g. for venting a back chamber of the receiver by providing fluid communication through the aligned vent apertures in the base and in the vent element from the back chamber to an outside of the receiver housing.

Figure 6:
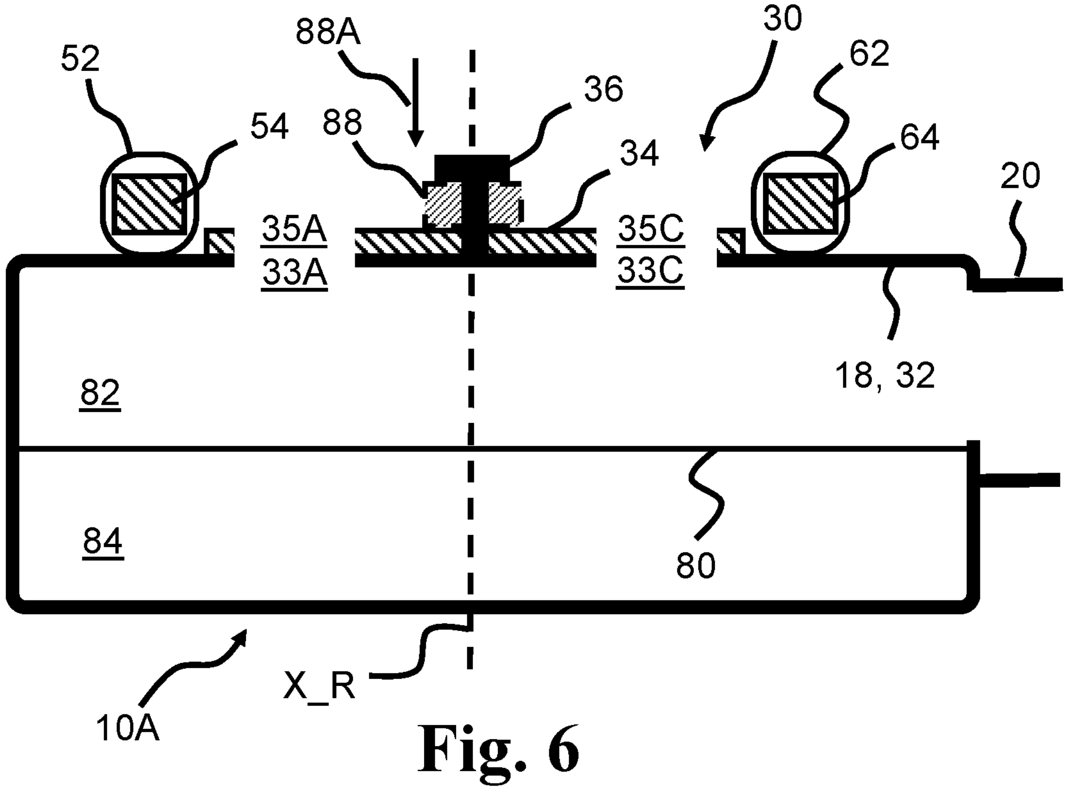
FIG. 6 shows a cross-section of a receiver.

FIG. 6 shows a cross-section of the receiver 10A in FIG. 2 with the vent element 34 in the second position. In receiver 10A, the first receiver wall 18 forms the base 32, i.e. vent apertures 33A, 33B, 33C, 33D are formed in the first receiver wall 18.

Figure 7:
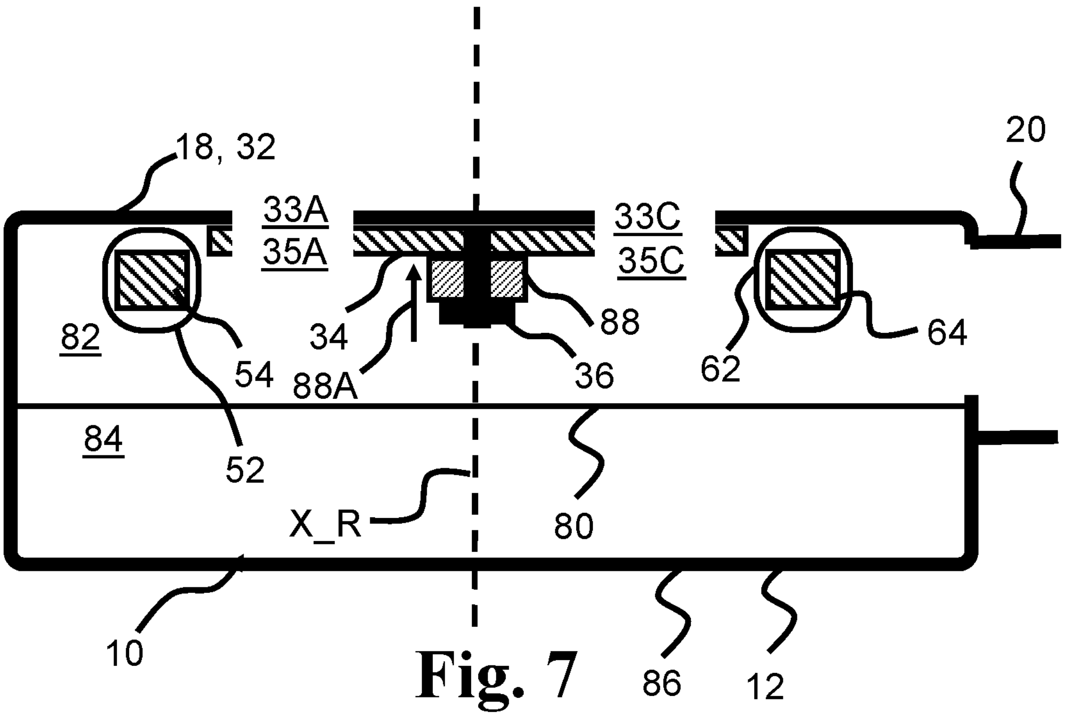
FIG. 7 shows a cross-section of a receiver.

FIG. 7 shows a cross-section of a receiver 10B where the vent assembly 30 is arranged inside the receiver housing 12, e.g. to protect the vent assembly. In FIG. 7, the vent element 34 is in the second position. In receiver 10B, the first receiver wall 18 forms the base 32, i.e. vent apertures 33A, 33B, 33C, 33D are formed in the first receiver wall 18.

Figure 8:
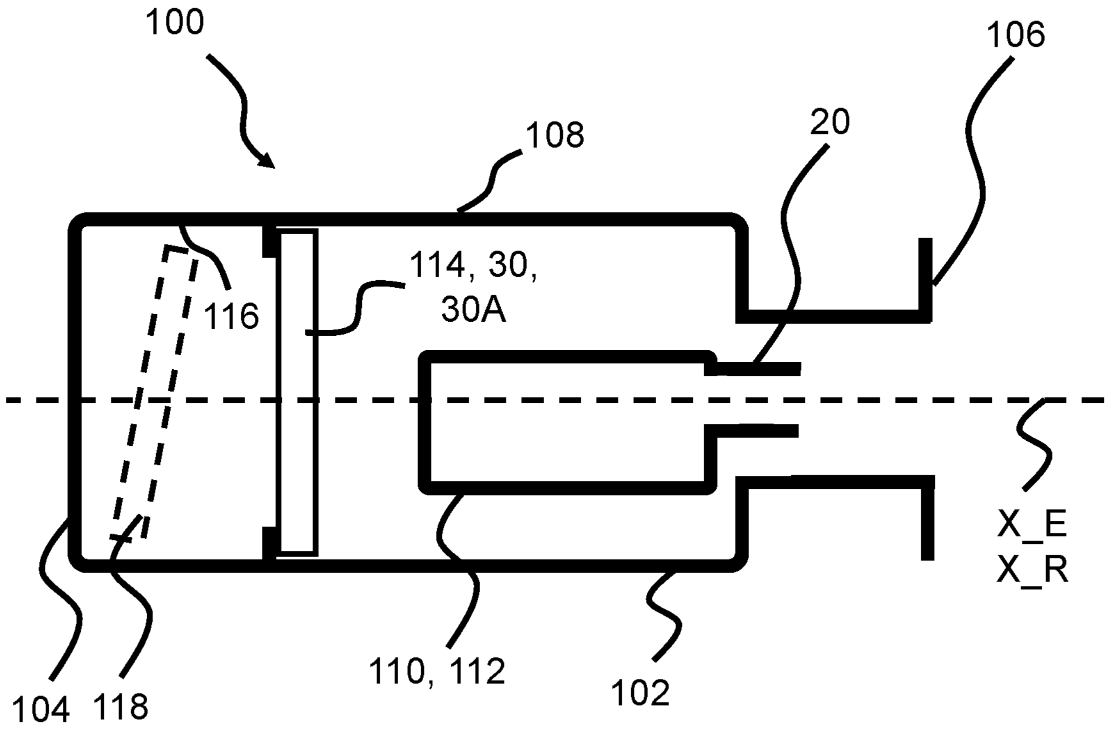
FIG. 8 shows an earpiece with a vent assembly.

FIG. 8 shows an exemplary earpiece for a hearing device. The earpiece 100 can be inserted into an ear canal of a user and has a longitudinal axis X_E. The earpiece 100 comprises an earpiece housing 102 with a distal end 104 and a proximal end 106 connected by an outer surface 108. The earpiece comprises a receiver 110 having a receiver housing 112 with a spout 20. The earpiece comprises a vent assembly 114 as described herein, e.g. corresponding to vent assembly 30 with the base configured to seal with circumferential rim on inner surface 116 of the earpiece housing. The vent assembly 114, 30 is optionally arranged distal to the receiver as illustrated in the earpiece 100. The vent element and/or vent actuator mechanism may be arranged on the distal side or the proximal side of the base. The earpiece 100 may comprise a microphone 118 optionally distal of the vent assembly 114. In the illustrated earpiece 100, the rotation axis X_R of the vent assembly 114, 30 is parallel to the longitudinal axis X_E. The rotation axis X_R of the vent assembly 114, 30 may be slightly angled, e.g. less than 20 degrees, in relation to the longitudinal axis X_E The earpiece housing has one or more vent apertures (not shown) distal to the vent assembly 114, 30.

Figure 9:
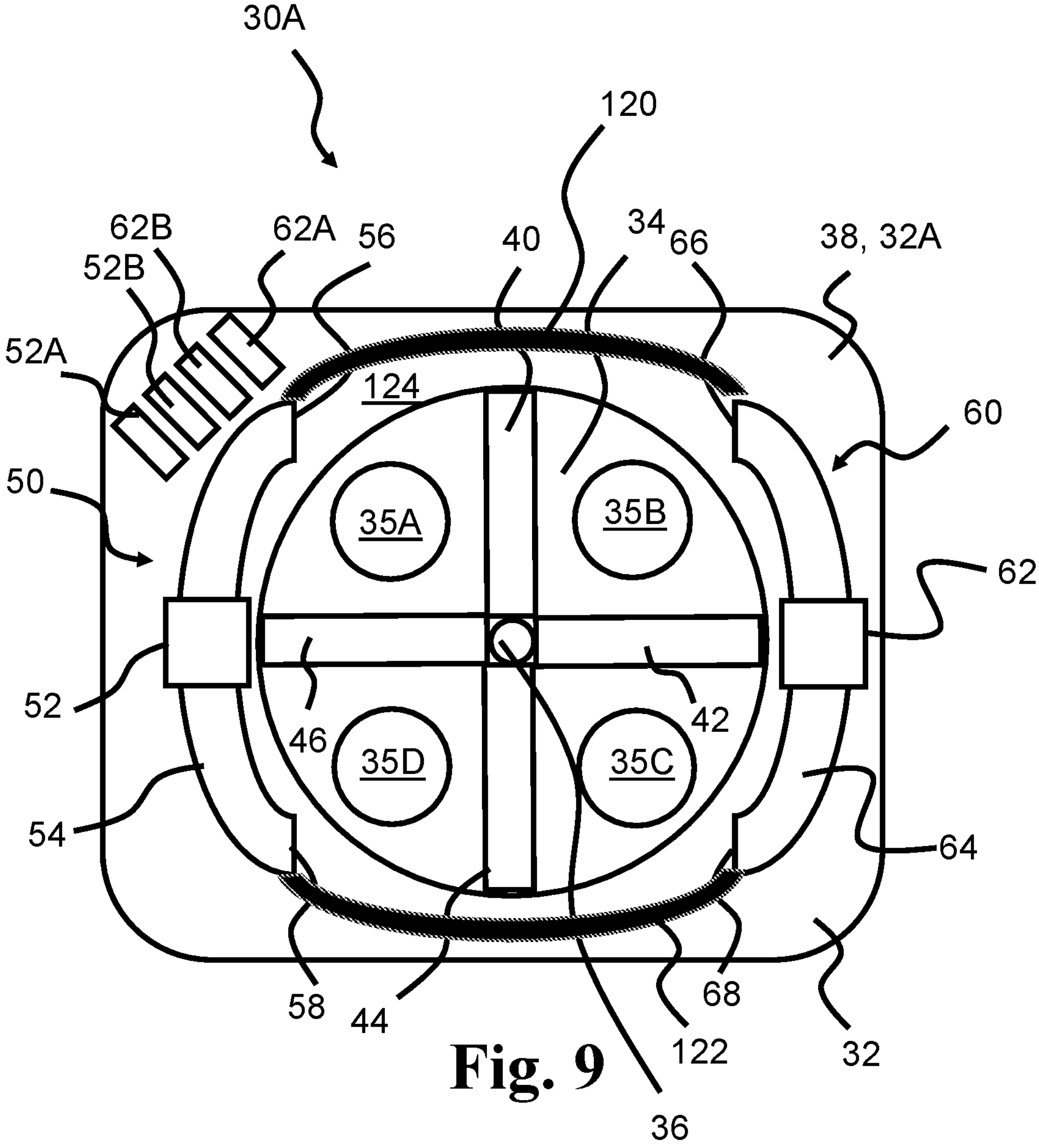
FIG. 9 shows an exemplary vent assembly.

FIG. 9 shows a view of an exemplary vent assembly for an earpiece/hearing device. The vent assembly 30A comprises one or more side walls extending from the first surface 32A of the base 32. The one or more side walls comprises a first side wall 120 extending between the first end 56 and the first end 66, and a second side wall 122 extending between the second end 58 and the second end 68. The base 32, magnetic actuators 50, 60, and side walls 120, 122 define or form a cavity 124 accommodating the vent element 34, magnets 40, 42, 44, 46, and axle member 36. The side walls 120, 122 and the magnetic actuators 50, 60 may be glued and sealed to a surface having a vent aperture, such as the outer surface of a receiver, such as to the outer surface of the first receiver wall 18.

Figure 10:
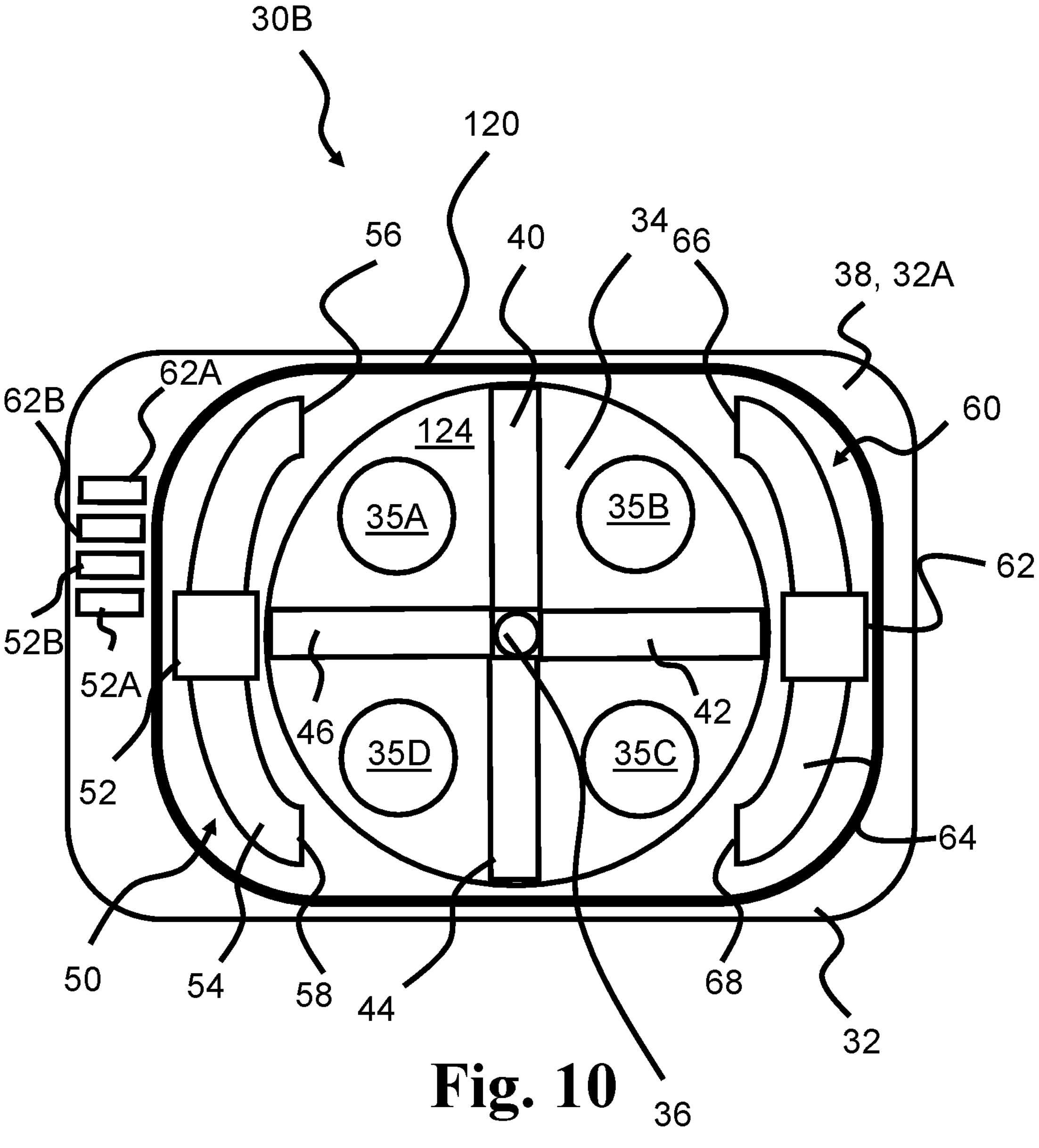
FIG. 10 shows an exemplary vent assembly.

FIG. 10 shows a view of an exemplary vent assembly for an earpiece/hearing device. The vent assembly 30B comprises a single side wall 122 extending from the first surface 32A of the base 32. The base 32 and the first side wall 120 define or form a cavity 124 accommodating the magnetic actuators 50, 60, vent element 34, magnets 40, 42, 44, 46, and axle member 36. The side wall 120 may be glued and sealed to a surface having a vent aperture, such as the outer surface of a receiver, such as to the outer surface of the first receiver wall 18.

Figure 11:
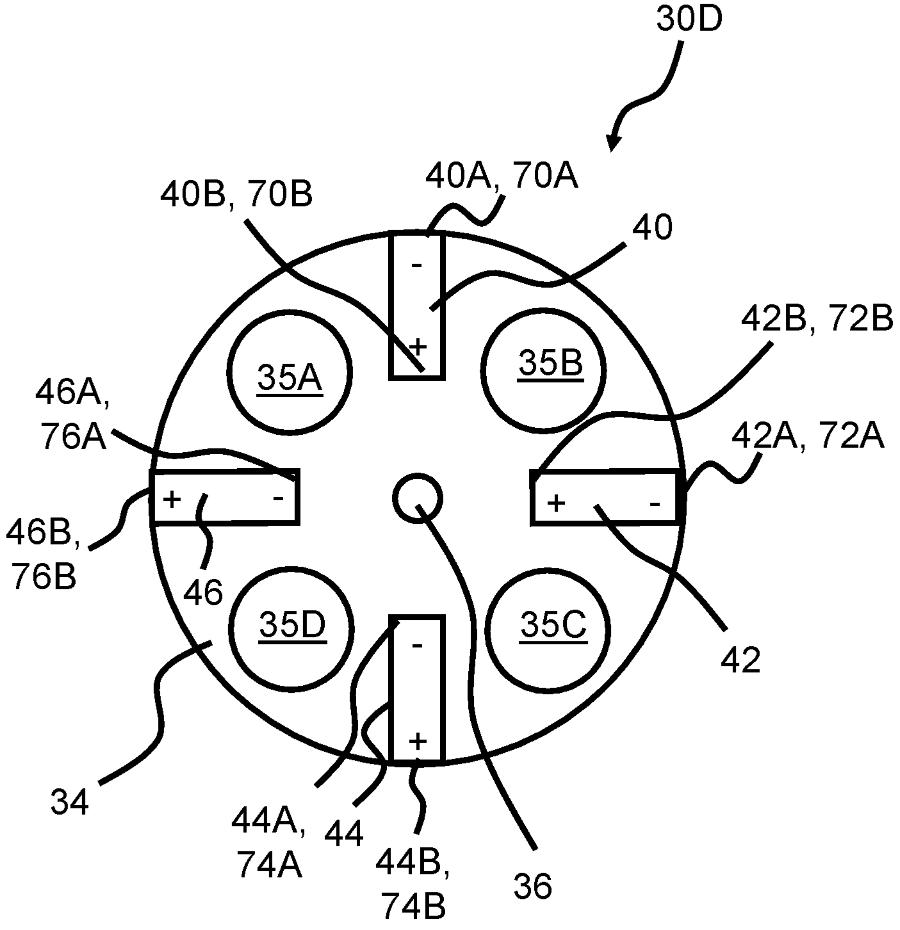
FIG. 11 shows parts of a vent assembly.

FIG. 11 shows parts of a vent assembly. The magnets 40, 42, 44, 46 have a length of about a third of the radius of circular vent element 32. Shorter bar magnets may allow for larger vent apertures.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-10 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

10, 10A, 10B receiver, hearing device receiver
12 receiver housing
14 distal end
16 proximal end
18 first receiver wall
20 spout
22 membrane
24 front chamber
26 back chamber
30, 30A, 30B vent assembly
32 base
32A first surface of base
32B second surface of base
33A first vent aperture of base
33B second vent aperture of base
33C third vent aperture of base
33D fourth vent aperture of base
34 vent element
35A first vent aperture of vent element
35B second vent aperture of vent element
35C third vent aperture of vent element
35D fourth vent aperture of vent element
36 axle member
38 surface of base
40 first magnet
40A first pole
40B second pole
42 second magnet
42A first pole
42B second pole
44 third magnet
44A first pole
44B second pole
46 fourth magnet
46A first pole
46B second pole
50 first magnetic actuator
52 first coil
52A first primary terminal
52B first secondary terminal
54 first flux aligner
56 first end of first flux aligner
58 second end of first flux aligner
60 second magnetic actuator
62 second coil
62A second primary terminal
62B second secondary terminal
64 second flux aligner
66 first end of second flux aligner
68 second end of second flux aligner
70A first end of first magnet
70B second end of first magnet
72A first end of second magnet
72B second end of second magnet
74A first end of third magnet
74B second end of third magnet
76A first end of fourth magnet
76B second end of fourth magnet
80 receiver membrane
82 front chamber
84 back chamber
86 second receiver wall
88 spring
88A force
100 earpiece
102 earpiece housing
104 distal end
106 proximal end
108 outer surface of earpiece housing
110 receiver
112 receiver housing
114 vent assembly
116 inner surface of earpiece housing
118 microphone
120 first side wall of vent assembly
122 second side wall of vent assembly
124 cavity
X_1 primary axis
X_2 secondary axis
X_R rotation axis
X_E earpiece axis, longitudinal axis of earpie

The invention claimed is:

1. A receiver for a hearing device, the receiver comprising;

a receiver housing having a distal end, a proximal end, and a wall extending between the distal end and the proximal end, wherein the proximal end of the receiver housing has a sound output port;

a receiver membrane; and a vent assembly configured to vent a chamber of the receiver housing, the vent assembly comprising a base, the base having one or more vent apertures comprising a first vent aperture, wherein the base is a part of the wall of the receiver housing or is a separate component that is coupled to the receiver housing;

wherein the vent assembly also comprises a vent element, the vent element configured to block the one or more vent apertures of the base when the vent element is in a first position, and to provide fluid communication with the one or more vent apertures of the base when the vent element is in a second position; and wherein the vent element of the vent assembly is distal to the proximal end of the receiver housing, and is located between the proximal end and the distal end of the receiver housing.

2. The receiver according to claim 1, wherein the vent element is configured to move relative to the base from the first position to the second position.

3. The receiver according to claim 1, wherein the vent assembly comprises an actuator assembly configured to move the vent element from the first position to the second position and/or from the second position to the first position.

4. The receiver according to claim 3, wherein the actuator assembly comprises one or more magnets including a first magnet coupled to the vent element, and a first magnetic actuator coupled to the base, wherein the first magnetic actuator comprises a first coil and a first flux aligner configured to apply a first magnetic flux to the first magnet.

5. The receiver according to claim 4, wherein the one or more magnets comprises a second magnet, a third magnet, and a fourth magnet coupled to the vent element, wherein the first magnet and the third magnet are along a primary axis, and wherein the second magnet and the fourth magnet are along a secondary axis.

6. The receiver according to claim 3, wherein the actuator assembly comprises a first magnet, a second magnet, a third magnet, and a fourth magnet.

7. The receiver according to claim 1, wherein the vent assembly is inside the receiver housing.

8. A hearing device comprising the receiver of claim 1.

9. The receiver according to claim 1, wherein the vent element is inside the receiver housing.

10. The receiver according to claim 1, wherein the vent element is outside the receiver housing.

11. A receiver for a hearing device, the receiver comprising;

a receiver housing having a distal end, a proximal end, and a wall extending between the distal end and the proximal end;

a receiver membrane; and a vent assembly configured to vent a chamber of the receiver housing, the vent assembly comprising a base, the base having one or more vent apertures comprising a first vent aperture, wherein the base is a part of the wall of the receiver housing or is a separate component that is coupled to the receiver housing;

wherein the vent assembly also comprises a vent element, the vent element configured to block the one or more vent apertures of the base when the vent element is in a first position, and to provide fluid communication with the one or more vent apertures of the base when the vent element is in a second position;

wherein the vent element is configured to move relative to the base from the first position to the second position; and wherein the vent assembly comprises an axle member, and wherein the vent element is configured to rotate about a rotation axis of the axle member from the first position to the second position.

12. A receiver for a hearing device, the receiver comprising;

a receiver housing having a distal end, a proximal end, and a wall extending between the distal end and the proximal end, wherein the proximal end of the receiver housing has a sound output port;

a receiver membrane; and a vent assembly configured to vent a chamber of the receiver housing, the vent assembly comprising a base, the base having one or more vent apertures comprising a first vent aperture, wherein the base is a part of the wall of the receiver housing or is a separate component that is coupled to the receiver housing;

wherein the vent assembly also comprises a vent element, the vent element configured to block the one or more vent apertures of the base when the vent element is in a first position, and to provide fluid communication with the one or more vent apertures of the base when the vent element is in a second position; and wherein the vent element of the vent assembly is distal to the proximal end of the receiver housing; and wherein the vent element comprises one or more vent openings, the one or more vent openings comprising a first vent opening, wherein the first vent opening of the vent element is aligned with the first vent aperture of the base when the vent element is in the second position.

13. A receiver for a hearing device, the receiver comprising;

a receiver housing having a distal end, a proximal end, and a wall extending between the distal end and the proximal end;

a receiver membrane; and a vent assembly configured to vent a chamber of the receiver housing, the vent assembly comprising a base, the base having one or more vent apertures comprising a first vent aperture, wherein the base is a part of the wall of the receiver housing or is a separate component that is coupled to the receiver housing;

wherein the vent assembly also comprises a vent element, the vent element configured to block the one or more vent apertures of the base when the vent element is in a first position, and to provide fluid communication with the one or more vent apertures of the base when the vent element is in a second position;

wherein the vent assembly comprises an actuator assembly configured to move the vent element from the first position to the second position and/or from the second position to the first position;

wherein the actuator assembly comprises a first magnet, a second magnet, a third magnet, and a fourth magnet; and wherein the first magnet and the third magnet are respectively on different sides of a rotation axis.

14. The receiver according to claim 13, wherein the different sides of the rotation axis comprise opposite sides of the rotation axis, and wherein the first magnet and the third magnet are respectively on the opposite sides of the rotation axis.

15. The receiver according to claim 14, wherein the second magnet and the fourth magnet are respectively on opposite sides of the rotation axis.

16. A receiver for a hearing device, the receiver comprising;

a receiver housing having a distal end, a proximal end, and a wall extending between the distal end and the proximal end;

a receiver membrane; and a vent assembly configured to vent a chamber of the receiver housing, the vent assembly comprising a base, the base having one or more vent apertures comprising a first vent aperture, wherein the base is a part of the wall of the receiver housing or is a separate component that is coupled to the receiver housing;

wherein the vent assembly also comprises a vent element, the vent element configured to block the one or more vent apertures of the base when the vent element is in a first position, and to provide fluid communication with the one or more vent apertures of the base when the vent element is in a second position;

wherein the vent assembly comprises an actuator assembly configured to move the vent element from the first position to the second position and/or from the second position to the first position;

wherein the actuator assembly comprises one or more magnets including a first magnet coupled to the vent element, and a first magnetic actuator coupled to the base, wherein the first magnetic actuator comprises a first coil and a first flux aligner configured to apply a first magnetic flux to the first magnet; and wherein the actuator assembly comprises a second magnetic actuator coupled to the base, wherein the second magnetic actuator comprises a second coil and a second flux aligner configured to apply a second magnetic flux to the one or more magnets of the actuator assembly.

17. A receiver for a hearing device, the receiver comprising;

a receiver housing having a distal end, a proximal end, and a wall extending between the distal end and the proximal end;

a receiver membrane; and a vent assembly configured to vent a chamber of the receiver housing, the vent assembly comprising a base, the base having one or more vent apertures comprising a first vent aperture, wherein the base is a part of the wall of the receiver housing or is a separate component that is coupled to the receiver housing;

wherein the vent assembly also comprises a vent element, the vent element configured to block the one or more vent apertures of the base when the vent element is in a first position, and to provide fluid communication with the one or more vent apertures of the base when the vent element is in a second position; and wherein the vent assembly comprises a spring configured to apply a force to the vent element to create a tight fit between the base and the vent element.

18. A vent assembly for an earpiece, the vent assembly comprising a base, the base having one or more vent apertures comprising a first vent aperture, wherein the vent assembly also comprises a vent element, the vent element configured to block the one or more vent apertures of the base when the vent element is in a first position, and to provide fluid communication with the one or more vent apertures of the base when the vent element is in a second position; and wherein the vent element is configured to be coupled to a receiver housing at a location that is distal to a proximal end of the receiver housing.

19. A hearing device comprising the vent assembly of claim 18.

20. The vent assembly according to claim 18, wherein the vent element is configured for placement inside a receiver housing.

21. The vent assembly according to claim 18, wherein the vent element is configured for placement outside the receiver housing.

22. The vent assembly according to claim 18, wherein the proximal end of the receiver housing has a sound output port.

* * * * *